(12) United States Patent
Saimi et al.

(10) Patent No.: US 6,584,059 B1
(45) Date of Patent: Jun. 24, 2003

(54) INFORMATION RECORDING AND REPRODUCING APPARATUS

(75) Inventors: Tetsuo Saimi, Osaka (JP); Seiji Nishino, Osaka (JP); Hidenori Wada, Osaka (JP); Teruhiro Shiono, Osaka (JP); Keiichi Matsuzaki, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/501,380

(22) Filed: Feb. 9, 2000

(30) Foreign Application Priority Data

Feb. 17, 1999 (JP) .............................. 11-039065
Mar. 31, 1999 (JP) .............................. 11-092563

(51) Int. Cl.$^7$ ............................................. G11B 7/00
(52) U.S. Cl. ............................................. 369/112.02
(58) Field of Search ........................ 369/94, 275.1, 369/109, 112.01, 44.12, 44.23, 112.03, 13, 103, 44.26, 44.37, 116, 112.02, 112.16, 112.17; 346/108; 350/96.11

(56) References Cited

U.S. PATENT DOCUMENTS

| | | | |
|---|---|---|---|
| 4,223,977 A | * 9/1980 | Papuchon et al. | 359/115 |
| 5,140,577 A | * 8/1992 | Ohsato | 369/44.11 |
| 5,168,485 A | 12/1992 | Lehureau et al. | 369/44.12 |
| 5,347,297 A | 9/1994 | Gage | 346/108 |
| 5,436,883 A | * 7/1995 | Sugiura | 369/109.02 |
| 5,513,158 A | 4/1996 | Ohsato | 369/44.23 |
| 5,594,713 A | 1/1997 | Komma et al. | 369/112 |
| 5,633,845 A | * 5/1997 | Horiguchi | 369/44.26 |
| 5,684,779 A | * 11/1997 | Ohuchida et al. | 369/103 |
| 5,734,637 A | 3/1998 | Ootaki et al. | 369/112 |
| 5,870,353 A | * 2/1999 | Morimoto et al. | 369/13.55 |
| 6,175,543 B1 | * 1/2001 | Burr et al. | 369/103 |

FOREIGN PATENT DOCUMENTS

| | | |
|---|---|---|
| EP | 0 459 790 | 12/1991 |
| EP | 0 663 604 | 12/1994 |
| EP | 881 634 | 12/1998 |
| EP | 984 440 | 3/2000 |
| JP | 60-202552 | 10/1985 |
| WO | WO 99/42993 | 8/1999 |
| WO | WO 99/46767 | 9/1999 |

OTHER PUBLICATIONS

J. Jahns, et al. "Dammann gratings for laser beam shaping;" Optical Engineering; vol. 28, No. 12; Dec., 1989; pp. 1267–1275.

* cited by examiner

Primary Examiner—William Korzuch
Assistant Examiner—Kimlien Le
(74) Attorney, Agent, or Firm—Merchant & Gould P.C.

(57) ABSTRACT

An information recording and reproducing apparatus in accordance with the present invention has a radiation light source, a collimator turning a light beam emitted from the radiation light source into substantially parallel light, a light beam convergence member focusing the light beam on an information carrier, a light beam polarization-branching member branching the light beam by polarization, a variable wave plate located between the collimator and the light beam convergence member, photo detectors receiving the light beam branched by the light beam polarization-branching member and outputting a current according to an incident light quantity, and an output level judging member judging whether an output of the photo detectors is larger or smaller than a predetermined value. When the photo detectors receive a small light quantity because the information carrier is highly birefringent, the variable wave plate is switched from a ¼ wavelength plate to a zero-wave plate, thus constantly obtaining a stable reproducing signal with an excellent S/N.

6 Claims, 15 Drawing Sheets

(a)

(b)

INFORMATION RECORDING AND REPRODUCING APPARATUS

BACKGROUND OF THE INVENTION

1. Field of the Invention

[The invention I]

The present invention I relates to an information recording and reproducing apparatus with a new system that can be used in an optical disk for recording or for reproducing information and suppresses the generation of light quantity fluctuations.

[The invention II]

The present invention II relates to an information recording and reproducing apparatus having high efficiency in which, in an optical disk for recording or reproducing information, the information is reproduced with a plurality of light beams to increase the transfer speed of a reproducing signal, and the information is recorded with one light beam to increase recording efficiency.

In addition, the present invention II relates to an information recording and reproducing apparatus having high efficiency in which, the information is reproduced by dividing a light beam for use in a stable tracking servo signal such as a three-beam tracking or a DPP (Differential Push-pull) tracking, and the information is recorded with one light beam to increase recording efficiency.

2. Description of the Prior Art

[The invention I]

Conventional optical disks have recorded or reproduced information by using a light beam polarization-branching member, that is located between a radiation light source and a light beam convergence member and separates an outward light beam and a return light beam by polarization of light, in order to increase light efficiency.

In the following, a conventional example that has been used frequently is explained with reference to FIG. 6.

A light beam 602 emitted from a radiation light source 601 passes through a polarization-branching member 603 and a ¼ wavelength plate 604. The polarization-branching member 603 transmits only a linearly polarized light (P polarized light). The light beam passing through the ¼ wavelength plate 604 is converted into circularly polarized light and reaches a light beam convergence member 605. The light beam converged by the light beam convergence member 605 reaches a record information carrier 606. The light beam is reflected by the record information carrier 606, passes through the light beam convergence member 605 again and then reaches the ¼ wavelength plate 604. The light beam becomes a linearly polarized light (S polarized light) perpendicular to the incident light in the ¼ wavelength plate 604, and is reflected by the polarization-branching member 603. The light beam becomes a transmitted light and a partially diffracted light by a hologram 607 for detection, and reaches a photo detector 608 for reproducing a servo signal or an information signal. Since the effects of the hologram 607 for detection and the photo detector 608 are not directly related to the present invention, an explanation here is omitted.

Since this optical system uses the polarization, when there is an optical element that disturbs the polarization state of a light beam, a light quantity of the light beam returning to the photo detector 608 may decrease. For example, in a record information carrier such as an optical disk made of plastic materials, the molecular structure of the plastics changes due to later stress such as a residual stress from molding and a temperature change, generating larger birefringence. When the record information carrier 606 is birefringent, the polarization state may be disturbed as is mentioned above. In other words, light that is circularly polarized may become elliptically polarized, linearly polarized or leading to a reverse circular polarization, in an extreme case. Accordingly, the light beam that is reflected by the information carrier and transmitted by the ¼ wavelength plate 604 may be the same polarized light (P polarized light) as the incident beam, in the worst case, and not reflected by the polarization-branching member 603 because the polarization-branching member 603 only transmits P polarized lights. As a result, the light does not reach the photo detector 608 at all. Usually, when a light quantity of a light beam shining into the photo detector 608 decreases, it is designed that an automatic gain control (AGC) circuit is activated to compensate for the decrease of the light quantity. However, when the light quantity is too small, the circuit is, of course, not activated.

As is described above, in reproducing a highly birefringent optical disk, a considerable decrease of a received light quantity has been a problem when separating the outward and return beams by using polarization. Therefore, the conventional detection system poses a problem in that disturbed polarization generates a fluctuation of received light quantity, thereby affecting the detection of a servo signal and an information signal.

[The invention II]

Conventional optical disks have used a light beam emitted from a radiation light source as a single light beam, instead of dividing the light beam into a plurality of light beams, in order to increase a light efficiency in recording. On the other hand, in reproducing optical disks, a plurality of light beams are used in order to stabilize a tracking servo for tracking the disk.

Also, a reproducing method using a plurality of light beams in order to increase the transfer rate of a reproducing signal has already come into an actual use.

In the following, a conventional example of the reproducing system that has been used frequently is explained with reference to FIGS. 14 and 15.

FIG. 14 shows an information recording and reproducing apparatus provided with a system of generating three light beams, reproducing a signal with the light beam in the center and stabilizing a tracking with the light beams on both sides.

A light beam 1702 emitted from a radiation light source (a semiconductor laser) 1701 is divided into three light beams, that is, a zeroth-order light beam, + first order light beam and − first order light beam, by a diffraction grating 1703, reflected by a beam splitter 1704 and reaches a light beam convergence member (an objective lens) 1705. The light beams converged by the light beam convergence member 1705 reaches a record information carrier 1706. The light beams reflected by the record information carrier 1706 pass through the light beam convergence member 1705 and the beam splitter 1704 again, and then reaches a photo detector 1708 for reproducing a servo signal or an information signal. The three light beams divided by the diffraction grating 1703, which are a zeroth-order light beam, + first order light beam and − first order light beam, reach corresponding photo detectors 1708, 1709 and 1710. The information signal is obtained from the photo detector 1708, and the signal for tracking servo is obtained from a difference signal of the photo detectors 1709 and 1710. This system is called a three-beam system and widely known in general. Therefore, a detailed explanation is omitted here.

A so-called DPP (Differential Push-pull) system can be included in this three-beam system. A DPP (Differential Push-pull) system is a system in which the photo detectors 1709 and 1710 are divided in half respectively, light spots of the light beams shining into the respective photo detector are located between signal tracks to obtain a far field signal so that a difference between the far field signal and the other far field signal obtained by dividing the photo detector 1708 is used for correcting a tracking signal. This system is also widely known, so a detailed explanation is omitted here.

FIG. 15 shows the diffraction grating 1703 in detail. The diffraction grating is formed by providing a phase step with a constant period on one surface of a glass substrate 1801. Numeral 1802 denotes the zeroth-order light beam, numeral 1803 denotes the + first order light beam, and numeral 1804 denotes the − first order light beam. The light quantity of this zeroth-order light beam 1802 by the diffraction grating is about 50 to 80% of that of the incident light beam. Therefore, a laser with larger emitting power is needed for recording and reproducing information, leading to cost increase.

These systems share a problem. Namely, although they have no major problem when limited to reproducing information, they suffer from a power shortage of a light source when recording information.

This power shortage is caused by dividing a beam at the time of reproducing. For example, in the three-beam system, a light quantity proportion of the central zeroth-order light beam, + first order light beam, − first order light beam and a high order diffraction loss is usually about 7:1:1:1. In other words, the light quantity of the central zeroth-order light beam is reduced by approximately 30% compared with that of the incident light beam.

In multi-beam reproducing, since seven light beams, for example, are evenly divided, recording with this system is almost impossible.

SUMMARY OF THE INVENTION

[The invention I]

It is an object of the present invention I to prevent a considerable decrease of a received light quantity in recording or reproducing a highly birefringent optical disk for recording or reproducing information when separating the outward and return beams by using polarization and to provide an apparatus having high efficiency that can be used in an optical disk for recording or reproducing information.

In order to solve the above-mentioned problem, the first information recording and reproducing apparatus according to the present invention I includes a radiation light source, a light beam convergence member receiving a light beam emitted from the radiation light source and focusing the light beam on an information carrier, a light beam branching member that is located between the radiation light source and the light beam convergence member, branching the light beam, a photo detector receiving the light beam branched by the light beam branching member, and a variable wave plate located between the light beam branching member and the light beam convergence member.

With this apparatus, the phase difference of the variable wave plate is changed, thereby changing the phase difference of the light beam shining into the information carrier. The radiation light source can be a laser, an LED, a high intensity arc or the like, and the information carrier can be an optical disk, an optical tape, an optical memory carrier or the like.

A second information recording and reproducing apparatus according to the present invention I includes a radiation light source, a collimator receiving a light beam emitted from the radiation light source and turning the light beam into substantially parallel light, a light beam convergence member receiving the substantially parallel light and focusing the substantially parallel light on an information carrier, a light beam branching member that is located between the radiation light source and the collimator, branching the light beam, a photo detector receiving the light beam branched by the light beam branching member, and a variable wave plate located between the collimator and the light beam convergence member.

This apparatus has an advantage in that using the collimator turns the light beam passing through the variable wave plate into the substantially parallel light, reducing the angle dependence of the variable wave plate.

A third information recording and reproducing apparatus according to the present invention I includes a radiation light source, a light beam convergence member receiving a light beam emitted from the radiation light source and focusing the light beam on an information carrier, a light beam polarization-branching member that is located between the radiation light source and the light beam convergence member, branching the light beam by polarization, a variable wave plate located between the light beam polarization-branching member and the light beam convergence member, a photo detector receiving the light beam branched by the light beam polarization-branching member and outputting a current according to an incident light quantity, and an output level judging member judging whether an output of the photo detector is larger or smaller than a predetermined value. A phase difference of the variable wave plate is switched according to a judgement of the output level judging member.

With this apparatus, the phase difference of the variable wave plate can be changed when a detected signal decreases considerably while reproducing a highly birefringent optical disk or the like.

A fourth information recording and reproducing apparatus according to the present invention I includes a radiation light source, a collimator receiving a light beam emitted from the radiation light source and turning the light beam into substantially parallel light, a light beam convergence member receiving the substantially parallel light and focusing the substantially parallel light on an information carrier, a light beam polarization-branching member that is located between the radiation light source and the collimator, branching the light beam by polarization, a variable wave plate located between the collimator and the light beam convergence member, a photo detector receiving the light beam branched by the light beam polarization-branching member and outputting a current according to an incident light quantity, and an output level judging member judging whether an output of the photo detector is larger or smaller than a predetermined value. A phase difference of the variable wave plate is switched according to a judgement of the output level judging member.

This apparatus has an advantage in that the angle dependence of the variable wave plate in the third apparatus can be reduced, as is described in the second apparatus.

In the third and fourth information recording and reproducing apparatus, it is preferable that the light beam convergence member, the light beam polarization-branching member and the variable wave plate are integrated into a coupling member. With such a configuration, a system that stabilizes a far field tracking called a Collect Far-field can be realized. Japanese Patent No. 2523469 describes this system in detail.

A fifth information recording and reproducing apparatus according to the present invention I includes a first radiation light source, a second radiation light source, a dual wavelength branching member receiving a first light beam and a second light beam emitted from the first radiation light source and the second radiation light source and directing the first and second light beams in a predetermined direction, a light beam convergence member receiving the first and second light beams emitted from the dual wavelength branching member and focusing the first and second light beams on an information carrier, a variable wave plate located between the dual wavelength branching member and the light beam convergence member, a first photo detector and a second photo detector receiving the light beam branched by the dual wavelength branching member and outputting a current according to an incident light quantity, and an output level judging member judging whether an output of the first and second photo detectors is larger or smaller than a predetermined value. A phase difference of the variable wave plate is switched according to a judgement of the output level judging member.

Although the birefringence quantity changes according to wavelength when a substrate is birefringent, this apparatus provides an optimal reproducing for the corresponding wavelength by using the above-mentioned system.

In the first to fifth information recording and reproducing apparatus according to the present invention I, it is preferable that the phase difference of the variable wave plate is switched between substantially (n) times a used wavelength and substantially (n±¼ wavelength) times the used wavelength, wherein n is an integer. Setting the phase difference of the variable wave plate to be substantially (n) times the used wavelength provides the state practically equivalent to the one without wave plate. Accordingly, the light shining into the variable wave plate can maintain the initial polarization state and reaches the information carrier. On the other hand, setting the phase difference of the variable wave plate to be substantially (n±¼ wavelength) times the used wavelength provides the ¼ wavelength plate, and the light beam emitted from the light beam convergence member becomes circularly polarized.

In the present invention I, a new polarization switching member replaces the ¼ wavelength plate, in order to suppress large fluctuation of the received light quantity of the photo detector, as is described above. By switching polarization when the light quantity received by the photo detector is small, a polarization state of a light beam returning from the information carrier is switched, thereby increasing the light quantity received by the photo detector. In the present invention I, the variable wave plate as the polarization switching member can be a liquid crystal, a crystal showing an electrooptical effect, an electrostrictive element, a polarizing plate (Polaroid polarizing element), a photoelastic element, a plastic plate or the like as long as it can switch the polarization state, and is not limited specifically. When the received light quantity of the photo detector decreases, the element above is electrically or mechanically switched so as to increase the quantity, thereby preventing a servo operation or an information reproducing operation from becoming unstable. As a result, the information recording and reproducing apparatus can obtain a stable reproducing signal with an excellent S/N.

[The invention II]

It is an object of the present invention II to provide an information recording and reproducing apparatus provided with a system for compensating for the power shortage of the light source at the time of recording as is described above and for securing a compatibility of recording and reproducing that does not affect the precision of an optical system.

In the present invention II, a diffraction grating as a beam dividing member is removed when recording and inserted when reproducing, in order to secure compatibility between recording and reproducing. In order to solve this problem, mechanically removing the diffraction grating can be considered. However, while this is generally useful, the compatibility between recording and reproducing was relatively difficult to secure because of the strict setting precision of the diffraction grating that is required.

In order to secure the setting precision of the diffraction grating, the diffraction grating can be switched electrically, rather than mechanically.

Accordingly, in the present embodiment of the invention II, the diffraction grating is formed by electrically changing the refractive index. For example, a diffraction element is formed with a material that generates the refractive index difference when electricity is applied and does not generate the refractive index difference when no electricity is applied.

A first information recording and reproducing apparatus according to the present invention II includes a radiation light source, a light beam convergence member receiving a light beam emitted from the radiation light source and focusing the light beam on an information carrier, a light beam branching member that is located between the radiation light source and the light beam convergence member, branching the light beam in a first state and not branching the light beam in a second state, and a photo detector receiving the light beam branched by the light beam branching member. With this configuration, a stable tracking or a parallel reproducing of information signals can be performed in the first state, and information can be recorded using light sources with relatively low output in the second state.

It is preferable that the above-mentioned apparatus further includes a collimator that receives the light beam emitted from the radiation light source and turns the light beam into substantially parallel light, and that the light beam convergence member receives the parallel light and focuses the parallel light on the information carrier. Including the collimator turns the incident light beam to the light beam convergence member into the parallel light beam, thereby reducing a position dependence of the light beam convergence member in an optical axis direction.

A second information recording and reproducing apparatus according to the present invention II includes a radiation light source, a light beam convergence member receiving a light beam emitted from the radiation light source and focusing the light beam on an information carrier, a light beam branching member that is located between the radiation light source and the light beam convergence member, branching the light beam into a plurality of light beams in a first state and not branching the light beam in a second state, and a plurality of photo detectors receiving the plurality of light beams branched by the light beam branching member, irradiated on a plurality of information tracks on the information carrier and reflected by the information carrier. With above configuration, the information signals can be reproduced in parallel from a plurality of tracks in the first state, and a single light beam can be used to operate reproducing or recording a single track in the second state.

As is described above, with the present invention II, a light beam from a light source is divided into a plurality of light beams to perform a stable tracking control or to reproduce a plurality of information tracks in parallel, and a single light beam is used to record information, by using common light sources with relatively low output.

DESCRIPTION OF THE PREFERRED EMBODIMENTS

The following is a description of the preferred embodiments of the present invention, with reference to the accompanying drawings. The present invention is not limited to these drawings, but can be a variation thereof.

[The invention I]

Embodiment I-1

Figure 1:
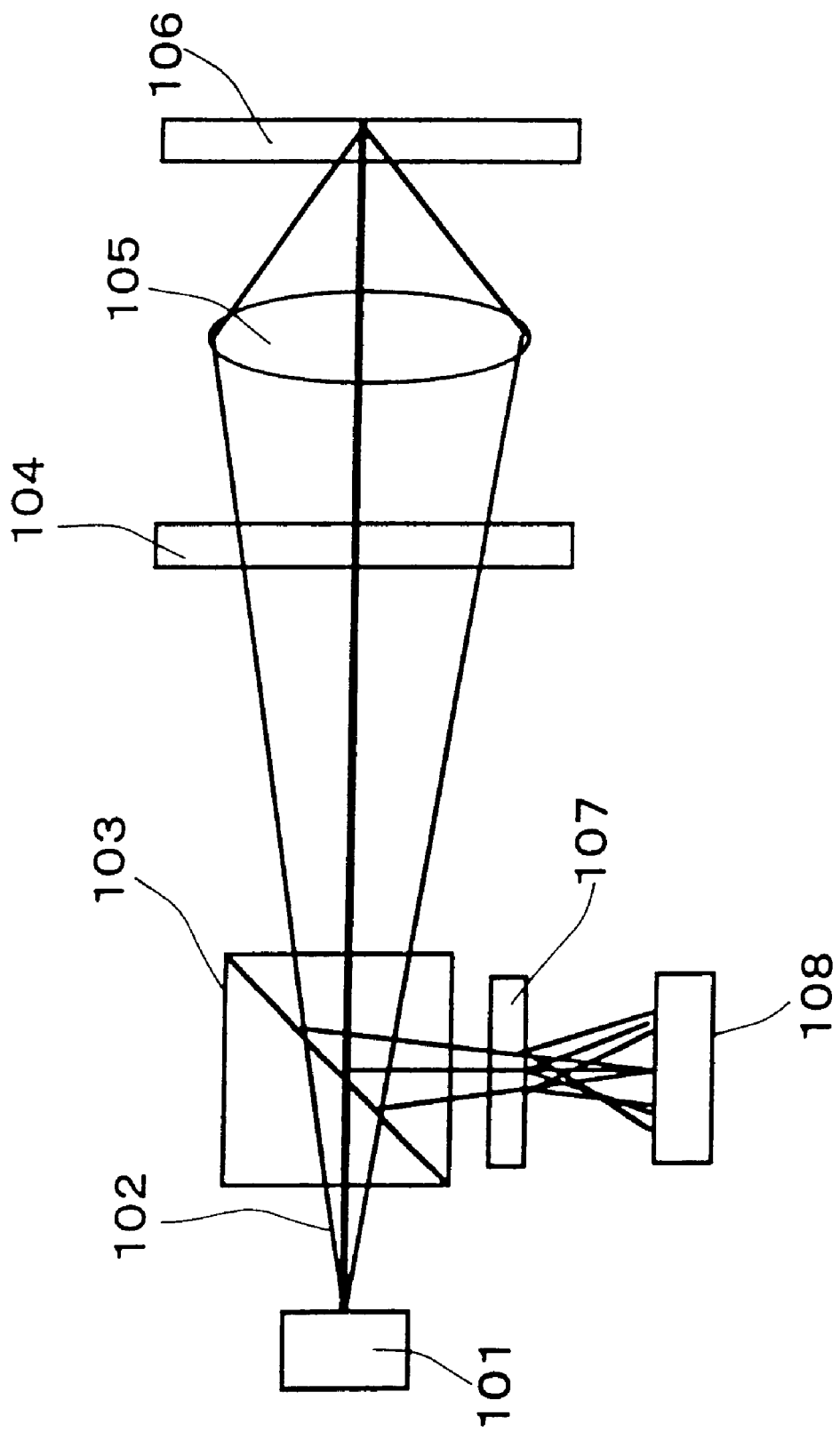
FIG. 1 is a structural view showing an information recording and reproducing apparatus according to an embodiment I-1 of the present invention I.

The embodiment I-1 of the present invention I is described with reference to FIG. 1. A light beam 102 emitted from a radiation light source 101 passes through a light beam branching member 103, a variable wave plate 104 and a light beam convergence member (an objective lens) 105, and reaches a record information carrier 106. The light beam reflected by the record information carrier 106 passes through the light beam convergence member 105 and the variable wave plate 104 again, is reflected by the branching member 103, becomes a transmitted light and a partially diffracted light by a hologram 107 for detection, and reaches a photo detector 108 for reproducing a servo signal and an information signal. Since the effects of the hologram 107 for detection and the photo detector 108 are not directly related to the present invention, an explanation here is omitted.

Since an optical system using a semiconductor laser emits a light polarized in a constant direction, when there is an optical element that disturbs the polarization state of a light beam in an optical path, the polarization state of the light beam returning to the photo detector 108 may be ruined. For example, in a record information carrier such as an optical disk made of plastic materials, the molecular structure of the plastics changes due to later stress such as a residual stress from molding or a temperature change, generating a larger birefringence. When the record information carrier 106 is birefringent, the polarization state may be disturbed as is mentioned above. In other words, light that is circularly polarized may become elliptically polarized, linearly polarized or leading to a reverse circular polarization, in an extreme case. Accordingly, the light beam that is reflected by the information carrier may be the same polarized light as the incident light. When the hologram 107 is a polarizing hologram, a diffracted light might not be generated because polarization is displaced from an initial state. As a result, the photo detector 108 receives less light quantity, and this may cause deterioration of a reproducing signal or, in the worst case, detecting the signal itself may become impossible. For example, a magneto-optical signal is detected by detecting polarization in the perpendicular direction and obtaining a difference signal thereof In this case, if a substrate or an optical system has a factor that disturbs the polarization, a jitter deterioration of the signal is caused.

The present invention uses the variable wave plate 104 to correct the disturbance of polarization. Crystal, plastics, liquid crystal or the like can be used for the variable wave plate 104. The liquid crystal is used here as an example. The liquid crystal is sealed between two transparent electrodes, and the refractive index is changed by applying a voltage to the two electrodes. Then, selecting the orientation direction of the liquid crystal generates an anisotropy equivalent to so-called uniaxial crystal whose refractive index changes according to directions. Selecting the quantity of this anisotropy and voltage to apply makes a given wave plate.

Embodiment I-2

Figure 2:
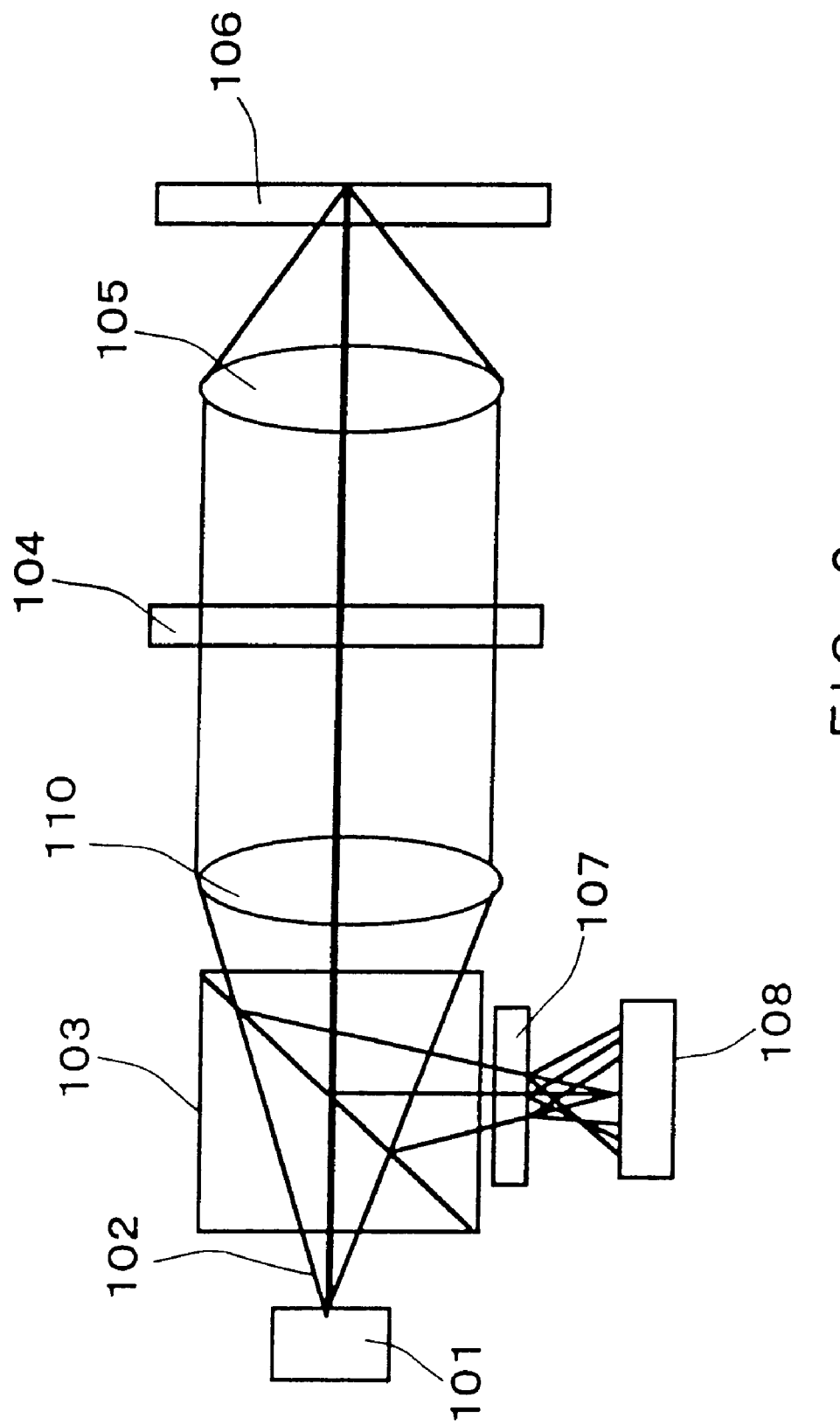
FIG. 2 is a structural view showing an information recording and reproducing apparatus according to an embodiment I-2 of the present invention I.

The embodiment I-2 of the present invention I is described with reference to FIG. 2. The configuration is substantially the same as that of the embodiment I-1 of the present invention I, but is different in that a collimator lens 110 is inserted between the radiation light source 101 and the variable wave plate 104. The light beam 102 emitted from the radiation light source 101 is turned into a substantially parallel light with this collimator lens 110. As a result, an incident angle of a light beam shining into the variable wave plate 104 becomes substantially constant, reducing an angle dependence of the variable wave plate 104. Thus, the property of the variable wave plate 104 improves.

Embodiment I-3

Figure 3:
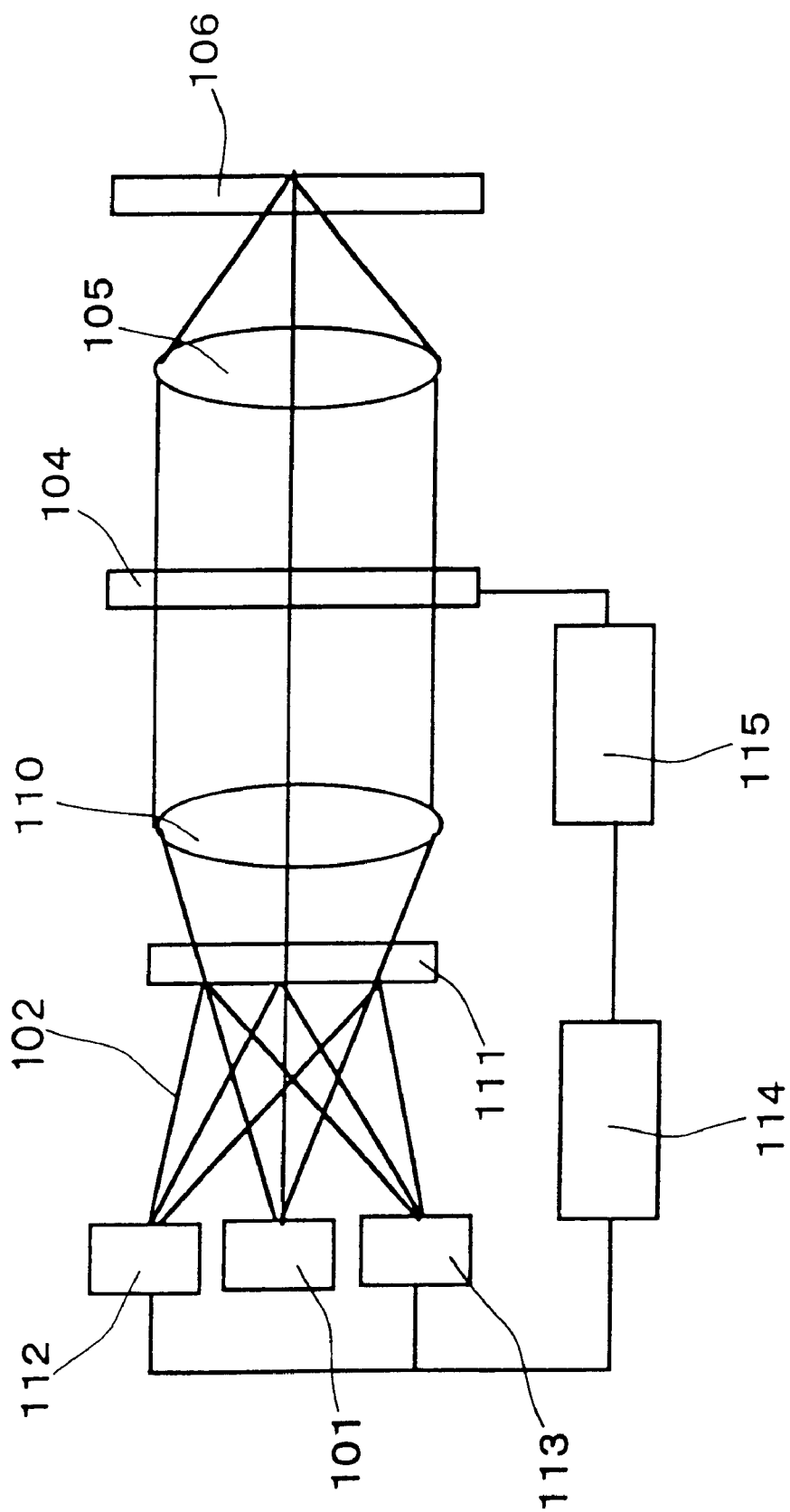
FIG. 3 is a structural view showing an information recording and reproducing apparatus according to an embodiment I-3 of the present invention I.

The embodiment I-3 of the present invention I is described with reference to FIG. 3. The light beam 102 emitted from the radiation light source 101 passes through a light beam polarization-branching member 111, the collimator lens 110, the variable wave plate 104 and the light beam convergence member 105, and reaches the record information carrier 106. The light beam reflected by the record information carrier 106 passes through the light beam convergence member 105 and the variable wave plate 104 again, is diffracted by the light beam polarization-branching member 111, and reaches photo detectors 112 and 113 for reproducing a servo signal and an information signal. A polarizing hologram for detection can be illustrated here as a specific example of the light beam polarization-branching member 111. Since the effects of the polarizing hologram and the photo detectors 112 and 113 are not directly related to the present invention, an explanation here is omitted. Since the optical system using a semiconductor laser emits the light polarized in a constant direction, the polarization-branching member 111 is arranged so that the emitted light passes through the polarization-branching member 111.

When there is an optical element that disturbs the polarization state of a light beam in an optical path, the light quantity of the light beams returning to the photo detectors 112 and 113 lessens. Also, when the record information carrier 106 is birefringent, the polarization state may be disturbed as is mentioned above. In other words, a light that is circularly polarized may become elliptically polarized, linearly polarized or leading to a reverse circular polarization, in an extreme case. Accordingly, the light beam that is reflected by the information carrier may be the same polarized light as the incident light. In this case, no diffracted light reaches the photo detectors 112 and 113. As a result, the photo detectors 112 and 113 receive less or no light quantity, and this may cause deterioration of a reproducing signal or, in the worst case, detecting the signal itself may become impossible. In other words, if a substrate or an optical system has a factor that disturbs the polarization, a jitter deterioration of the signal is caused.

The present embodiment I-3 of the present invention I uses the variable wave plate 104 to correct the disturbance of polarization. Crystal, plastics, liquid crystal or the like can be used for the variable wave plate 104. The liquid crystal is used here, which is the same as the embodiment I-1. The liquid crystal is sealed between two transparent electrodes, and the refractive index is changed by applying a voltage to the two electrodes. Then, selecting the orientation direction of the liquid crystal generates an anisotropy equivalent to a so-called uniaxial crystal whose refractive index changes according to directions. Selecting the quantity of this anisotropy and voltage to apply makes a given wave plate.

In the embodiment I-3 according to the present invention I, a light quantity detector 114 detects the light quantity shining into the photo detectors 112 and 113, and a comparator 115 outputs a signal for switching a phase difference of the variable wave plate 104 when the light quantity decreases below a predetermined light quantity. Usually, the ¼ wavelength plate is used in order to optimize the efficiency of a polarizing optical system, as is described in the conventional example. However, some information carriers using a plastic substrate such as an optical disk are highly birefringent. Therefore, in some cases, a circularly polarized light with the same polarization state as that of the emitted light beam returns. In that case, no light beam is diffracted in the polarization-branching member 111. In the present embodiment, the comparator 115 judges whether the current level emitted from the light quantity detector 114 is higher or lower than approximately a half of the predetermined current level, and when it is smaller than approximately the half of the predetermined current level, the phase difference of the variable wave plate 104 is changed to zero. In this manner, the variable wave plate 104 becomes a zero-wave plate, that is, an isotropic element equivalent to merely a glass plate, so the light beam reflected by a disk becomes circularly polarized, thereby increasing the light quantity. In other words, by standardizing a quantity received by the photo detectors 112 and 113 without any birefringence as 1, when the received light quantity by the photo detectors 112 and 113 that is reduced due to birefringence is expressed by a %, a light quantity obtained when switching the variable wave plate 104 from the ¼ wavelength plate to the zero-wave plate is expressed by (100−a) %. When the value of a % is 50% or less, the relationship between a % and (100−a) % is;

$$a\% < (100-a)\%$$

Thus, it is more advantageous to receive lights in the state of a zero-wave plate.

As is described above, changing a phase difference of the variable wave plate according to a light level received by the photo detector makes it possible to receive signals with high S/N. The present invention I is characterized not only in that the light quantity can be restored by this variable wave plate in an analog manner according to birefringence quantity, but also in that, as is described in the above example, the light quantity can be restored by judging whether the current level emitted from the photo detector is higher or lower than a value predetermined by such a way as learning when starting an optical disk system and then switching the variable wave plate in a digital manner. A representative example of the criterion is a value of 50% that is learned in advance, as is described in the embodiment I-3. However, switching the circuit at the value of 50% to switch the variable wave plate might result in hunting (i.e., undesired switching oscillation), when the light quantity is around 50%. In this case, an appropriate hysteresis is needed. For example, switching from the ¼ wavelength plate to the zero-wave plate is performed when the light quantity received by the photo detector becomes 45% or less, and switching from the zero-wave plate to the ¼ wavelength plate is performed when the light quantity received by the photo detector becomes 55% or more, thereby preventing the hunting. The value of this hysteresis is selected so as to be an optimal value for a system controlling the optical disk, thereby obtaining a stable reproducing signal with excellent S/N.

Although the embodiment I-3 is shown in an infinite system, the use of the collimator lens 110 that receives the light beam emitted from the radiation light source and makes it substantially parallel may be eliminated.

Embodiment I-4

Figure 4:
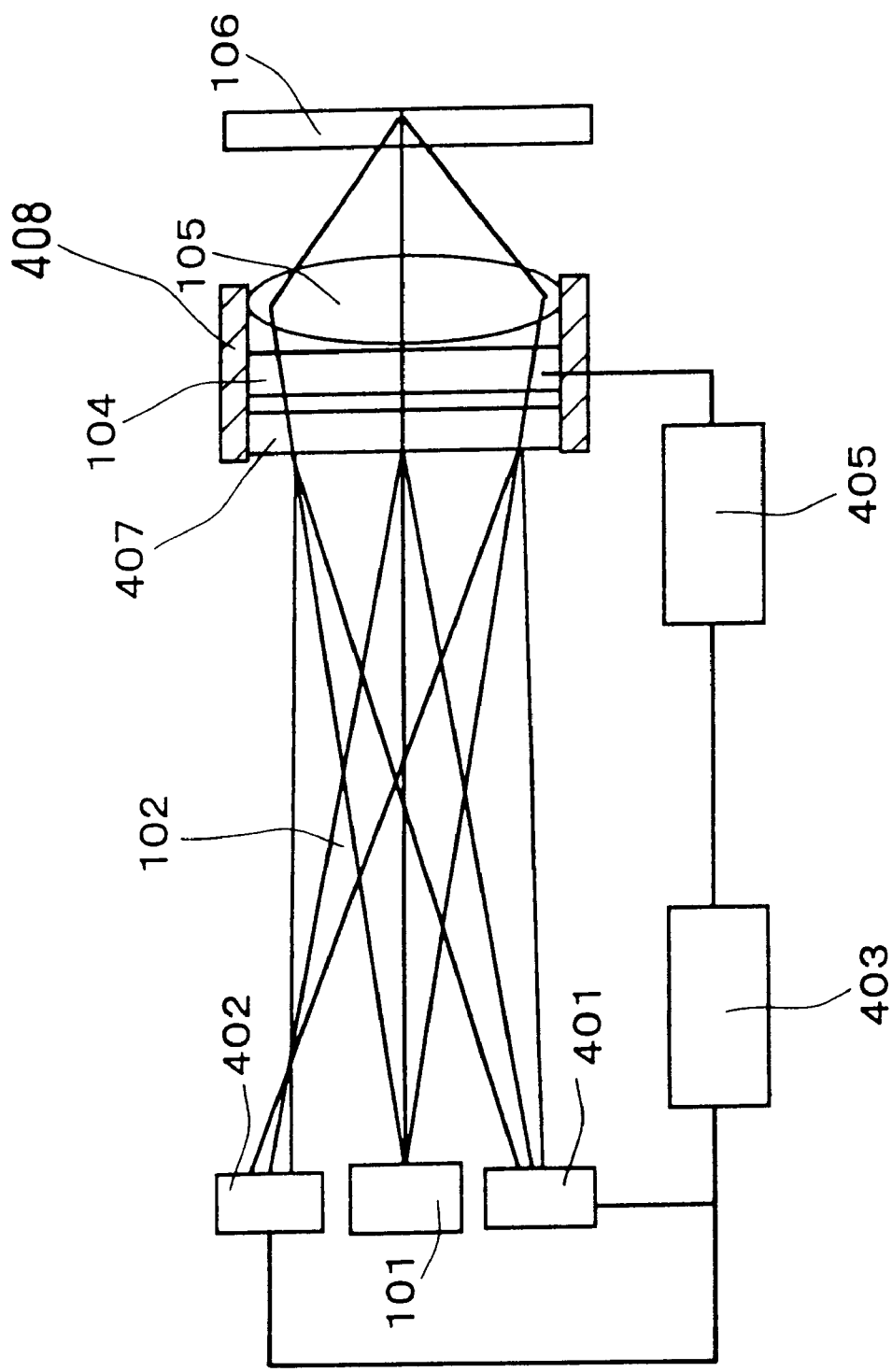
FIG. 4 is a structural view showing an information recording and reproducing apparatus according to an embodiment I-4 of the present invention I.

The embodiment 1-4 of the present invention I is described with reference to FIG. 4. In the present embodiment, a light beam polarization-branching member 407, the variable wave plate 104 and the light beam convergence member 105 are integrated into a coupling member 408 (for example, tubular goods) and moved uniformly.

When there is a factor that disturbs the polarization in an optical path, the polarization state of the light beams is disturbed so that an output according to the received light quantity output by photo detectors 401 and 402 lessens. Specifically, when the record information carrier 106 is birefringent, the polarization state may be disturbed as is mentioned above. As a result, the photo detectors 401 and 402 receive less or no light quantity, and this may cause deterioration of a reproducing signal or, in the worst case, detecting the signal itself may become impossible. In other words, if a substrate or an optical system has a factor that disturbs the polarization, a jitter deterioration of the signal is caused.

A light quantity detector 403 detects the light quantity shining into the photo detectors 401 and 402, and a comparator 405 outputs a signal for switching a phase difference of the variable wave plate 104 when the light quantity decreases below a predetermined light quantity. Usually, the ¼ wavelength plate is used in order to optimize the efficiency of a polarizing optical system. However, some information carriers using a plastic substrate such as an optical disk are highly birefringent. Therefore, in some cases, a circularly polarized light with the same polarization state as that of the emitted light beam returns. In that case, no light beam is diffracted in the polarization-branching member 407. The comparator 405 judges whether the current level emitted from the light quantity detector 403 is higher or lower than approximately a half of the predetermined current level, and when it is lower than approximately the half of the predetermined current level, the phase difference of the variable wave plate 104 is changed to zero. In this manner, the variable wave plate 104 becomes a zero-wave plate, that is, an isotropic element equivalent to merely a glass plate, so the light beam reflected by a disk becomes circularly polarized, thereby increasing the light quantity.

Embodiment I-5

Figure 5:
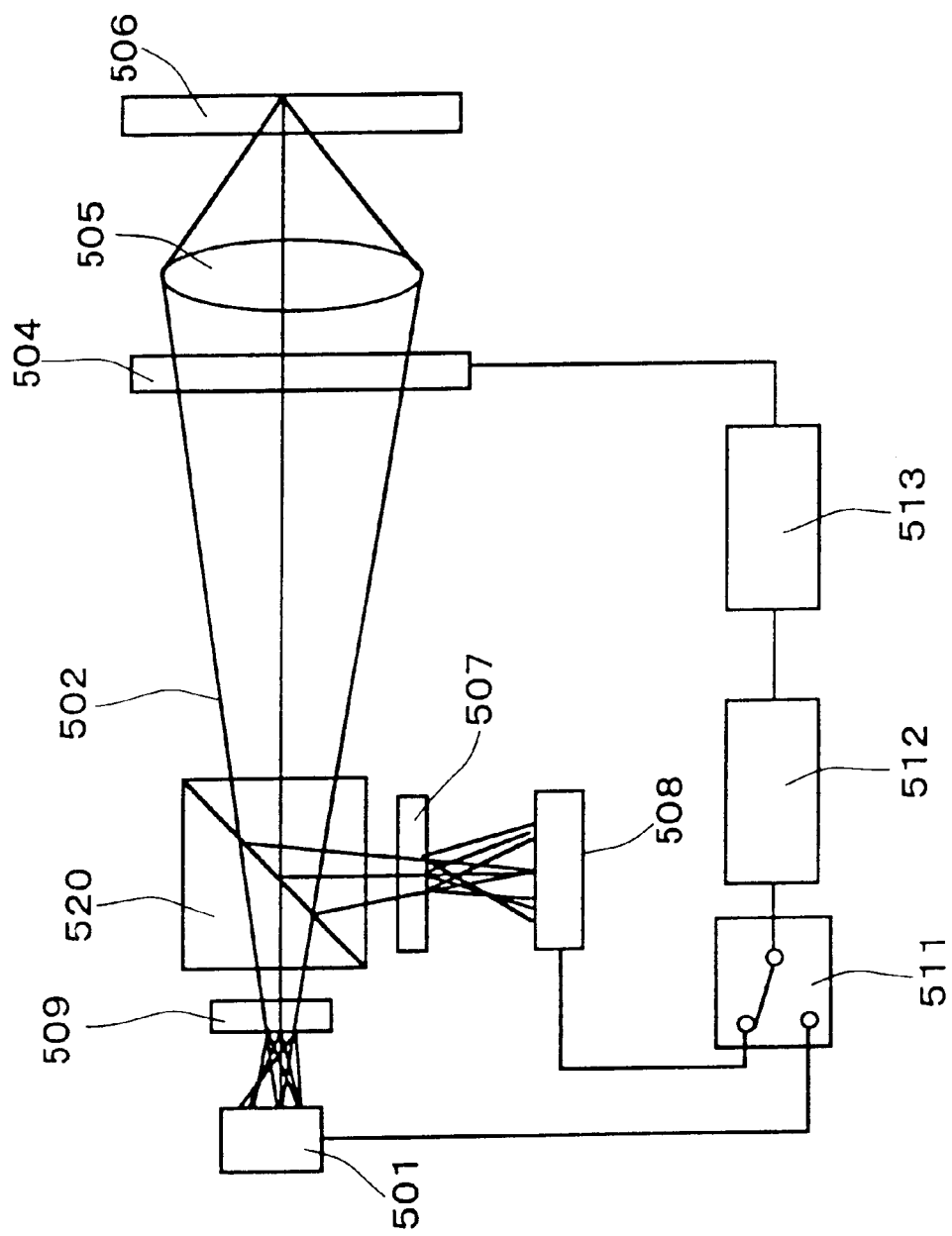
FIG. 5 is a structural view showing an information recording and reproducing apparatus according to an embodiment I-5 of the present invention I.
Figure 6:
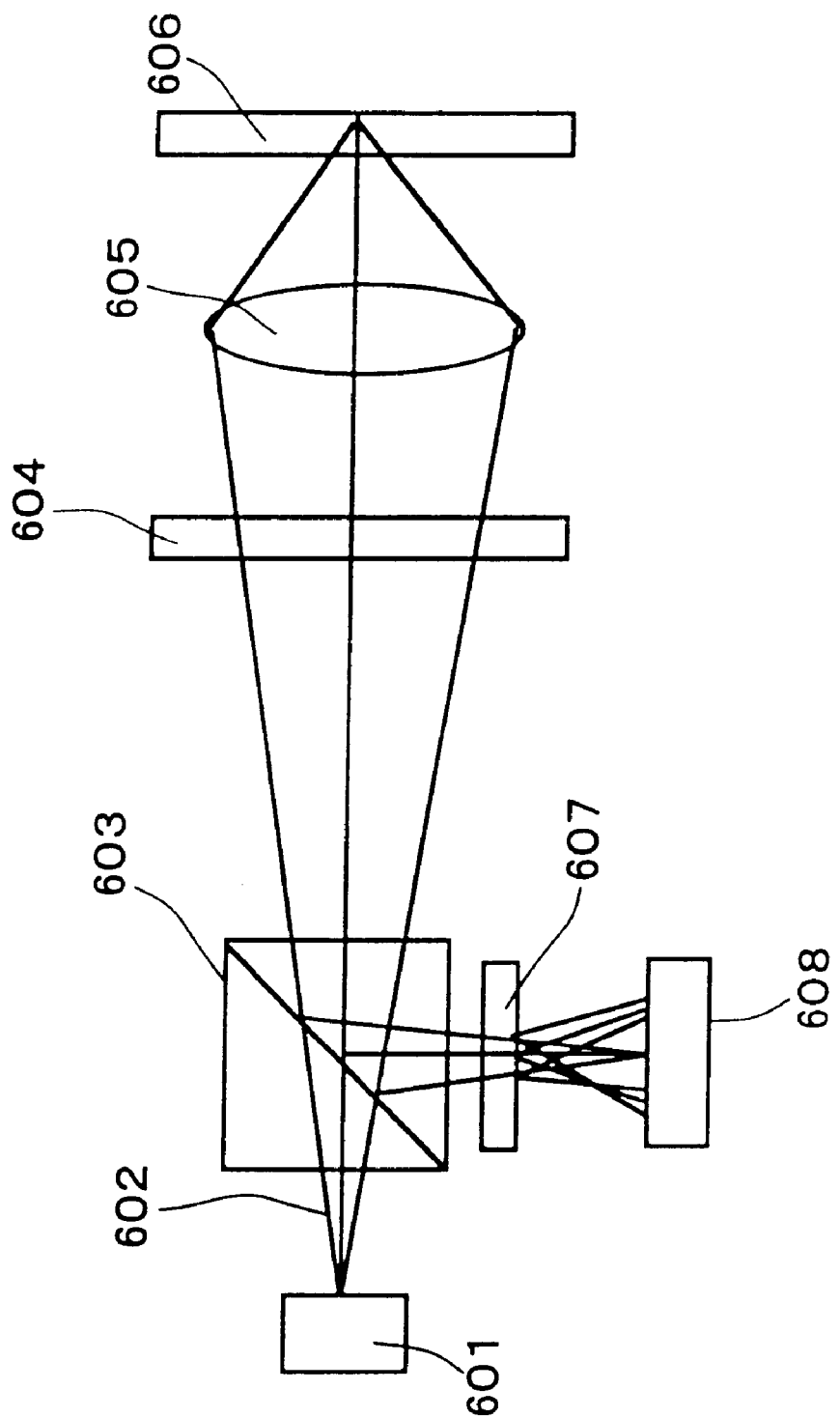
FIG. 6 is a structural view showing a conventional information recording and reproducing apparatus.

The embodiment I-5 of the present invention I is described with reference to FIG. 5.

This example shows a case where there are radiation light sources with a different wavelength. A first unit 501 in which a first radiation light source and a photo detector are unified and a second unit 508 in which a second light source and a photo detector are unified emit a light beam 502 respectively. The light beam 502 passes through a dual wavelength branching member 520, a variable wave plate 504 and a light beam convergence member 505, and reaches a record information carrier 506. The light beam reflected by the record information carrier 506 passes through the light beam convergence member 505, the variable wave plate 504 again, returns to an initial direction in the dual wavelength branching member 520, is diffracted by the polarizing holograms (the light beam polarization-branching members) 509 and 507 for detection and then reaches the photo detector for reproducing a servo signal and an information signal (stored in the first unit 501 and the second unit 508). Since the effects of the polarizing holograms for detection and the photo detectors are not directly related to the present invention, an explanation here is omitted. The output signal of the photo detector is sent to a light quantity detector 512 via a switch 511, which switches the circuit according to the operating unit, so that the incident light quantity is detected. When the light quantity decreases below a predetermined light quantity, a comparator 513 outputs a signal for switching a phase difference of the variable wave plate 504.

[The invention II]

Embodiment II-1

Figure 7:
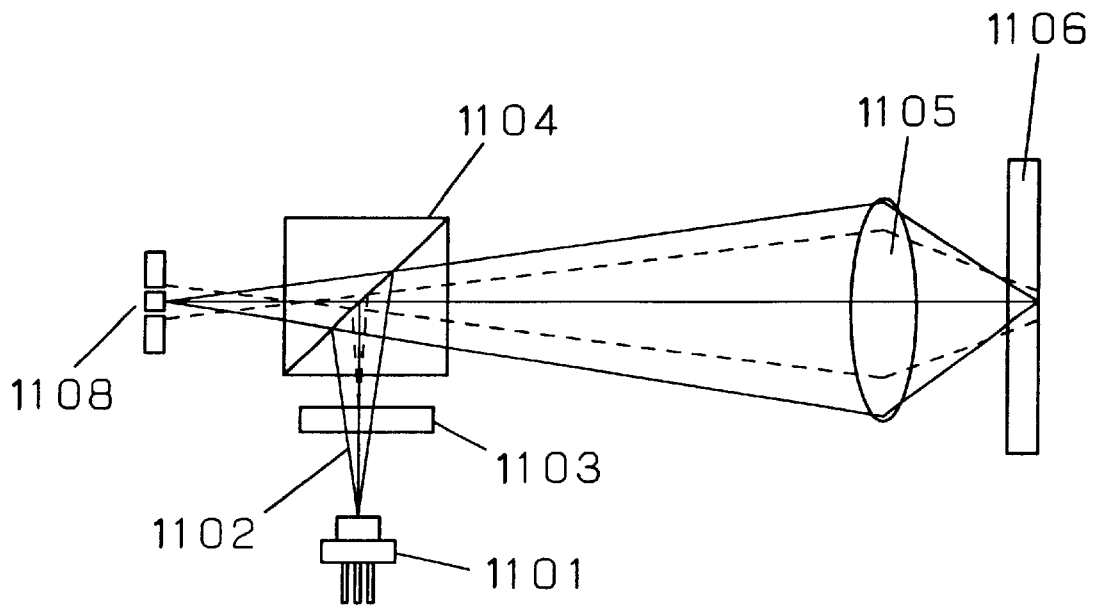
FIG. 7 shows an optical structure of an information recording and reproducing apparatus of the present invention II.
Figure 7:
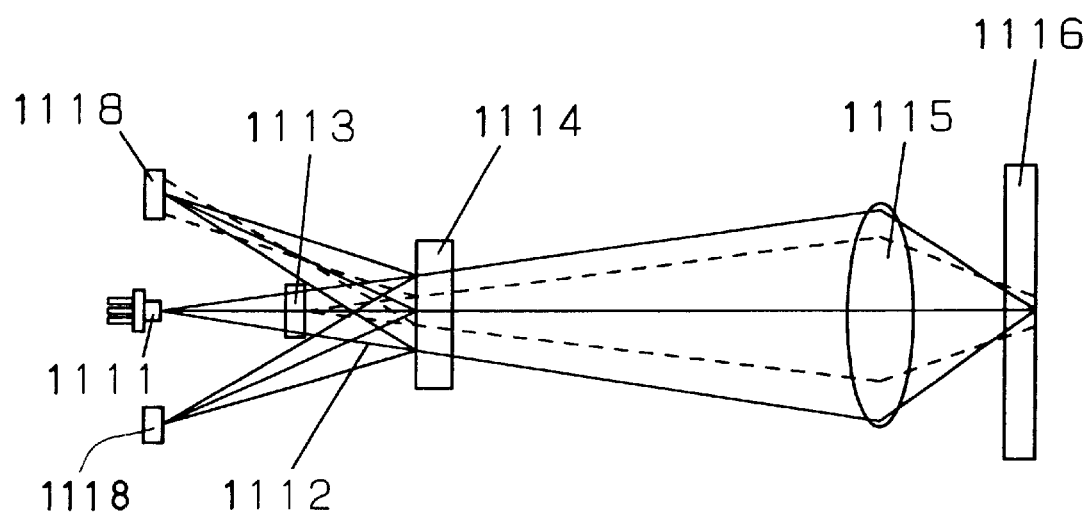

The embodiment II-1 of the present invention II is described with reference to FIG. 7(a). A light beam 1102 emitted from a radiation light source (a semiconductor laser) 1101 passes through a light beam branching member 1103, is reflected by a light beam dividing member 1104, passes through a light beam convergence member (an objective lens) 1105 and reaches a record information carrier 1106.

The light beam branching member 1103 is an element that splits a light beam in a first state and does not split a light beam in a second state. In the present embodiment, it was a variable diffraction element using a liquid crystal.

In other words, for example, a voltage is applied to the liquid crystal in the first state and not applied in the second state. Accordingly, the light beam branching member 1103 functions as a diffraction element in the first state and as a transparent plate equivalent to merely a glass plate in the second state. Thus, the second state does not generate a light quantity loss due to diffraction, realizing an information recording using a laser with relatively small optical output. Since yield of the laser manufacturing is deeply related to the optical output, cost can be decreased.

The light beam reflected by the record information carrier 1106 passes through the light beam convergence member 1105 again, passes through the light beam dividing member 1104 and reaches a photo detector 1108 for reproducing a servo signal and an information signal. Although a method for detecting a servo signal is not explained in detail here, a focus servo or a tracking servo can be performed by detecting the servo signal with a hologram or the like. Since this detection method, actual operation of the servo and the system thereof are not directly related to the present invention, an explanation here is omitted.

Embodiment II-2

The embodiment II-2 of the present invention II is described with reference to FIG. 7(b). A light beam 1112 emitted from a radiation light source 1111 passes through a light beam branching member 1113, a light beam dividing member 1114 and a light beam convergence member 1115 and reaches a record information carrier 1116. The light beam branching member 1113 is an element that branches a light beam in a first state and does not branch a light beam in a second state. In the present embodiment, it was a variable diffraction element using a liquid crystal. In other words, a voltage is applied to the liquid crystal in the first state and not applied in the second state. Accordingly, the light beam branching member 1113 functions as a diffraction element in the first state and as a transparent plate equivalent to merely a glass plate in the second state. Thus, the second state does not generate a light quantity loss due to diffraction, realizing an information recording using a laser with relatively small optical output.

The light beam reflected by the record information carrier 1116 passes through the light beam convergence member 1115 again, is diffracted by the light beam dividing member 1114 and reaches a photo detector 1118 for reproducing a servo signal and an information signal. Although a method for detecting a servo signal is not explained in detail here, a hologram or the like is used as the light beam dividing member 1114 and a focus servo or a tracking servo can be performed by detecting the servo signal with the photo detector 1118. Since this detection method, actual operation of the servo and the system thereof are not directly related to the present invention, an explanation here is omitted.

Embodiment II-3

Figure 8:
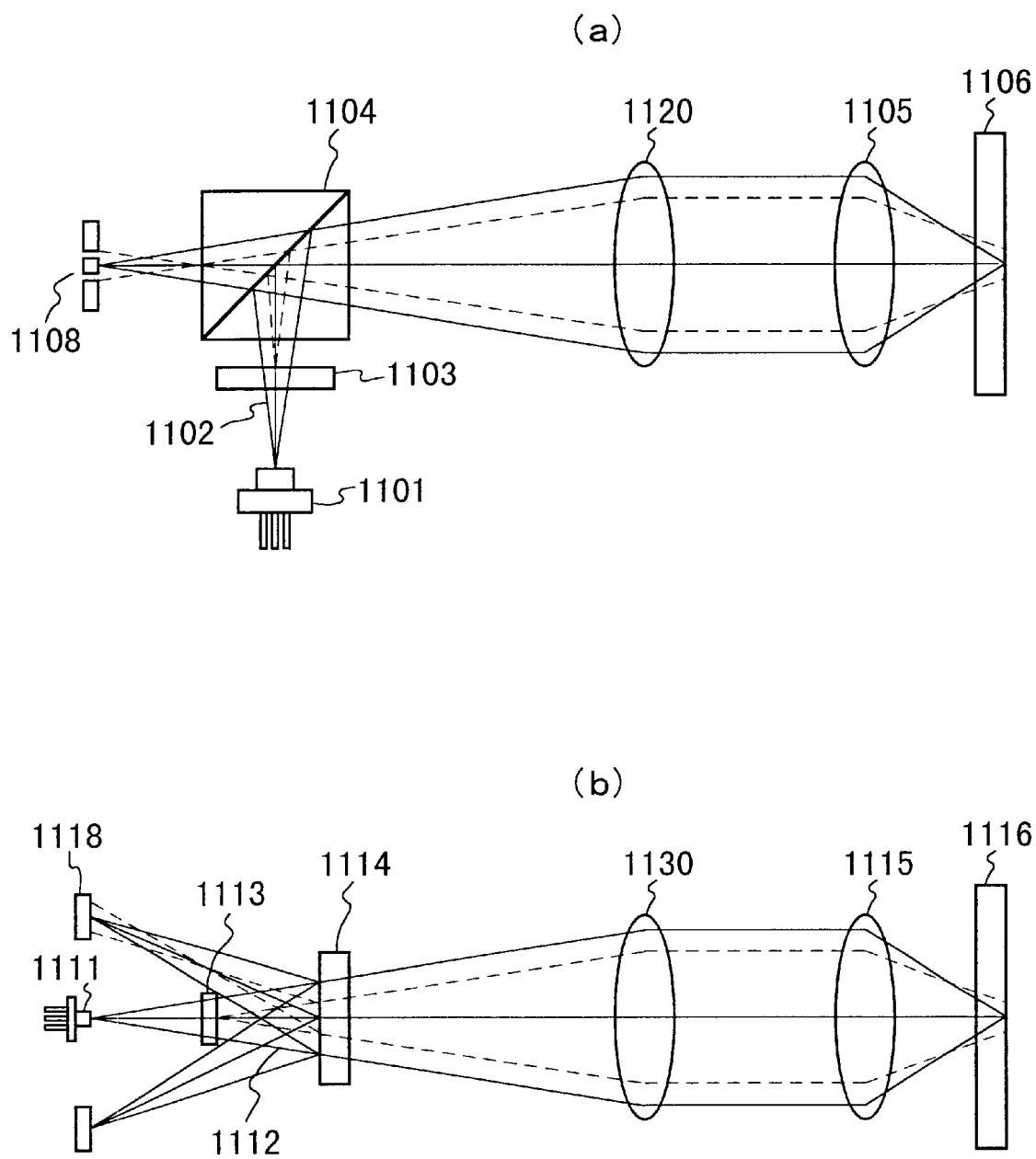
FIG. 8 shows another optical structure of the information recording and reproducing apparatus of the present invention II.

FIG. 8(a) shows a system in which a collimator lens is added to the embodiment II-1 described above. The light beam 1102 emitted from the radiation light source 1101 is turned into a parallel light by the collimator lens 1120. The other operation is the same as that of the embodiment II-1.

Also, FIG. 8(b) shows a system in which a collimator lens is added to the embodiment II-2 described above. The light beam 1112 emitted from the radiation light source 1111 is turned into a parallel light by the collimator lens 1130. The other operation is the same as that of the embodiment II-2.

Embodiment II-4

Figure 9:
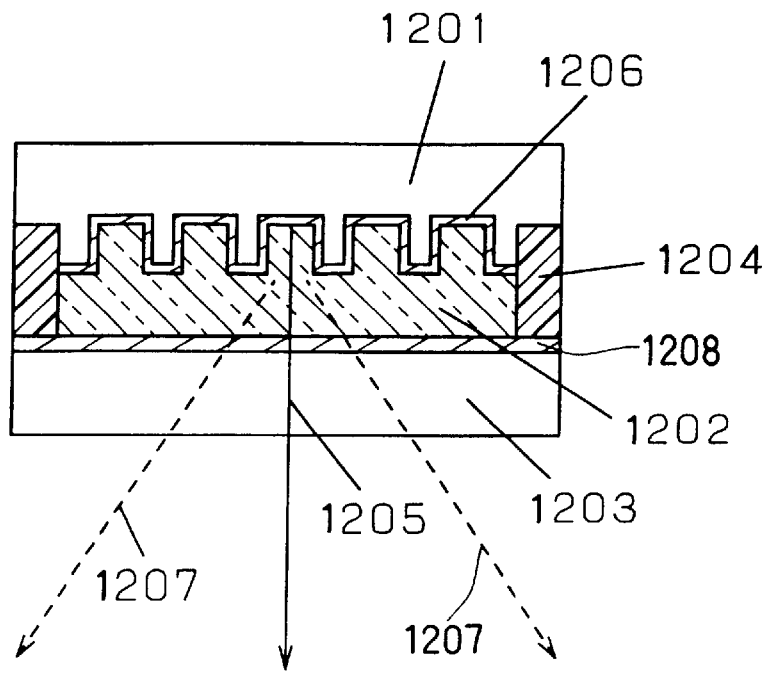
FIG. 9 is a cross-sectional view illustrating an embodiment of a light beam branching member of the present invention II.
Figure 9:
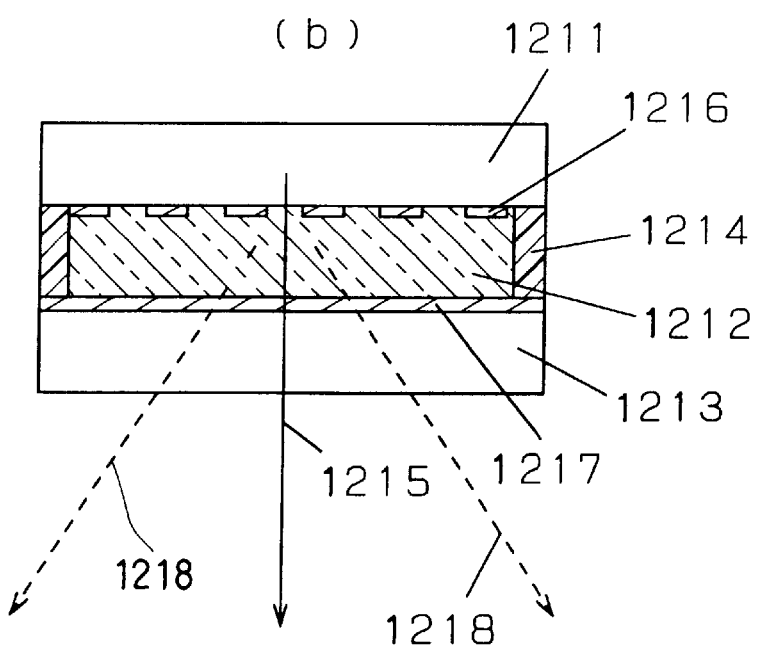

FIG. 9 is a schematic view illustrating an embodiment of a light beam branching member for generating multi-beams. FIG. 9(a) shows an embodiment of a variable diffraction element having diffraction gratings with a depth t generating multi-beams. A refractive index variable member 1202 is filled between a glass substrate 1201 with one surface on which concave and convex grooved diffraction gratings are formed and a glass substrate 1203 whose both surfaces are substantially parallel, so as to fill the diffraction grating portion. In the present embodiment, a liquid crystal was used as an example of the refractive index variable member. Solid crystals other than the liquid crystal may be used as well. Transparent electrodes 1206 and 1208 are disposed on the surface that the liquid crystal 1202 is in contact with the glass. The liquid crystal 1202 is sealed with a seal member 1204 so as to avoid leakage.

ITO (Indium Tin Oxide) or the like can be used for the transparent electrodes.

When the refractive index of the liquid crystal with no voltage applied is expressed by nc1 and the refractive index of the substrate glass is expressed by ng, the relationship below is satisfied.

$$nc1 \approx ng$$

When the phase difference generated by the diffraction gratings is expressed by $\Delta$, the wavelength of the light beam is expressed by $\lambda$, and the refractive index of the liquid crystal applied voltage between the transparent electrodes, which holds the liquid crystal therebetween, is expressed by n (v), the relationship below is satisfied.

$$\Delta = 2\pi(n(v) - nc1)t/\lambda$$

When applying no voltage, no phase difference is generated. Therefore, an incident light 1205 is not diffracted and directly transmitted. When voltage is applied, the relationship of n (v)>nc1 is satisfied and the diffraction gratings are formed. The intensity of a diffracted light 1207 changes according to the applied voltage. Usually, the intensity of the first order diffracted light is set to be 6 to 14% of that of the zeroth-order light.

FIG. 9(b) shows another embodiment of the variable diffraction element. A refractive index variable member 1212 is filled between a glass substrate 1211 on which transparent electrodes 1216 having stripe geometry are disposed and a glass substrate 1213 on which an even transparent electrode 1217 is disposed and whose both surfaces are substantially parallel, so as to fill the diffraction grating portion. In the present embodiment, a liquid crystal was used as an example of the refractive index variable member. Solid crystals other than the liquid crystal may be used as well. The liquid crystal is sealed with a seal member 1214 so as to avoid leakage. The liquid crystal is one of the typical members that can change its refractive index according to applied voltage.

The liquid crystal 1212 has the even refractive index when no voltage is applied between the transparent electrodes 1216 and 1217, while the portion between the electrodes has larger refractive index when a voltage is applied between the transparent electrodes 1216 and 1217. When the refractive index of the liquid crystal applied no voltage is expressed by nc2 and the refractive index of the transparent electrode is expressed by na, the relationship below is satisfied.

$$nc2 \approx na$$

When the phase difference generated by the diffraction gratings is expressed by $\Delta$, the wavelength of the light beam is expressed by $\lambda$, the refractive index of the liquid crystal applied voltage is expressed by n (v), and the thickness of the liquid crystal is expressed by d, the relationship below is satisfied.

$$\Delta = 2\pi(n(v) - nc2)d/\lambda$$

When applying no voltage, no phase difference is generated. Therefore, an incident light 1215 is not diffracted and directly transmitted. When voltage is applied, the relationship of n (v)>nc2 is satisfied and the diffraction gratings are formed. The intensity of a diffracted light 1218 changes according to the applied voltage. Usually, the intensity of the first order diffracted light is set to be 6 to 14% of that of the zeroth-order light.

Although the phase difference can be different according to the purpose, when using a system such as the three-beam tracking or the DPP tracking, the standard phase difference is $\pi/6$ or less depending on the respective design. Of course, the design out of this range is possible, but the optical system would have a somewhat low light beam efficiency.

The following is an explanation of an embodiment of a tracking control by using the variable diffraction element, as is shown in FIG. 9, that switches the generation of diffracted light and the zeroth-order light.

Figure 10:
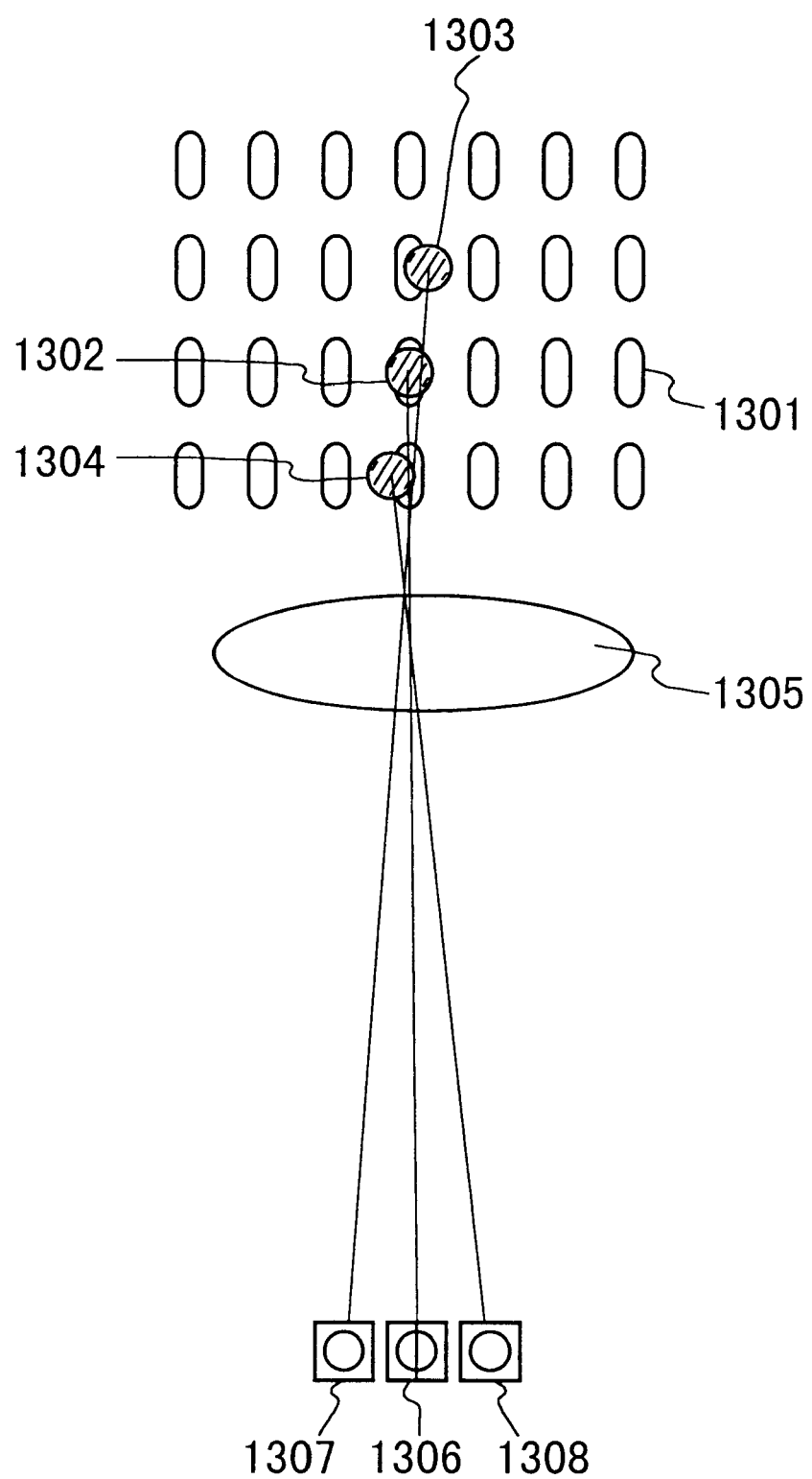
FIG. 10 shows the position of light spots on a disk when a three-beam tracking control is performed in an information recording and reproducing apparatus of the present invention II.

When applying voltage to the variable diffraction element, three light beams are generated. FIG. 10 shows the relationship between signal pits 1301 and light spots 1302, 1303 and 1304 on an optical disk when performing a three-beam tracking. Reflected light beams of the corresponding light spots are focused by a light beam convergence member 1305 and detected by photo detectors 1306, 1307 and 1308. The zeroth-order light beam is detected by the photo detector 1306, the + first order diffracted light is detected by the photo detector 1307, and the − first order diffracted light is detected by the photo detector 1308. Since the system of the three-beam tracking is already known, a detailed explanation is omitted here. When applying no voltage to the variable diffraction element, the light beam is transmitted directly and only the light spot 1302 is formed on the disk. The reflected light beam focused by the light beam convergence member 1305 is detected by the photo detector 1306 that is divided into two parts so as to perform a far field tracking. This enables an information recording because the light beam intensity is not lowered. As is described above, controlling the voltage applied to the variable diffraction element makes it possible to switch the three-beam tracking and the far field tracking.

Figure 11:
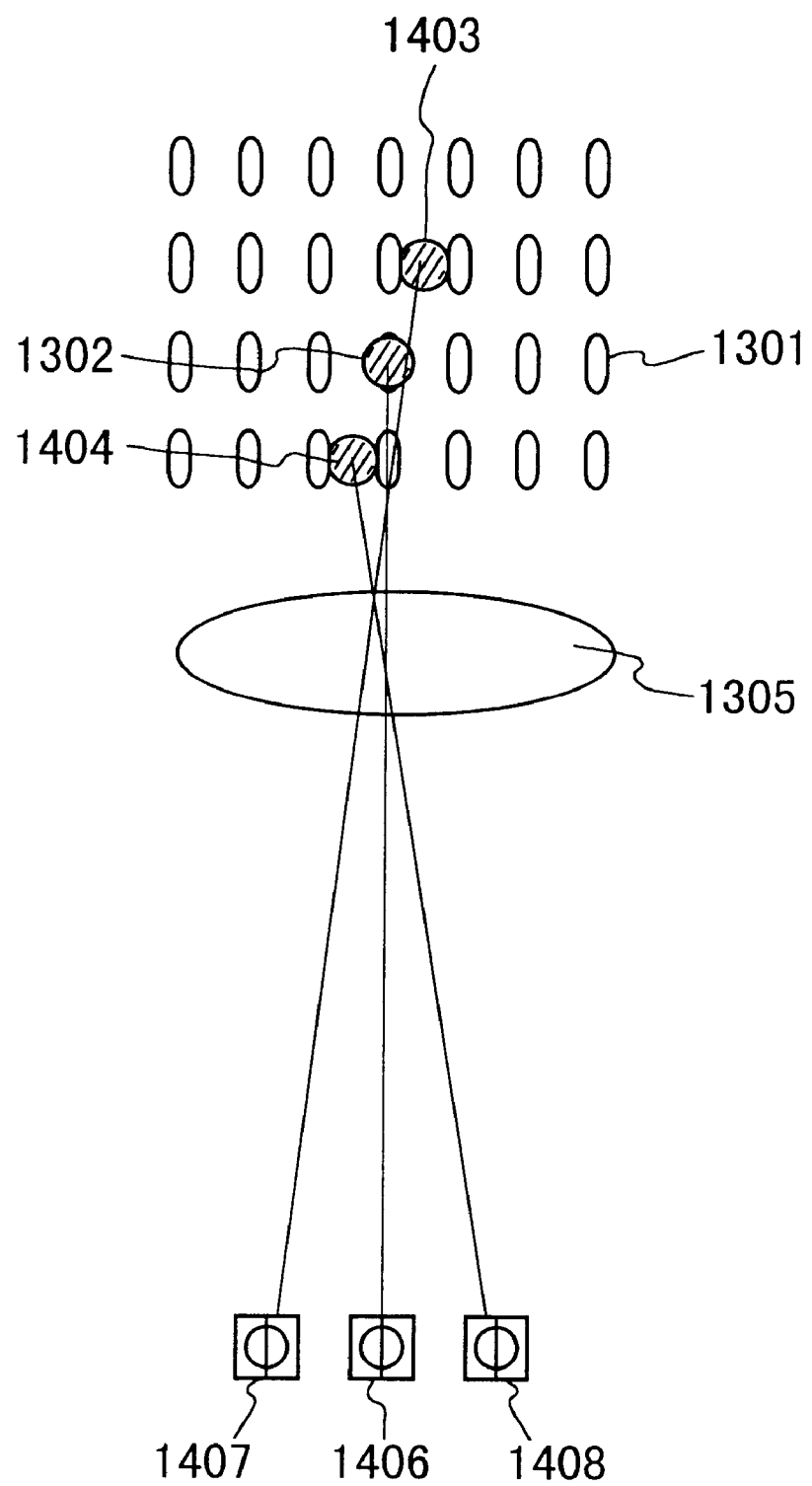
FIG. 11 shows the position of light spots on a disk when a DPP tracking control is performed in an information recording and reproducing apparatus of the present invention II.

FIG. 11 shows a switching system of a tracking called DPP (Differential Push-pull) and the far field tracking. Three light beams form the light spot 1302 on the track center and light spots 1403 and 1404 between tracks on a disk. Photo detectors 1406, 1407 and 1408 are divided into two parts respectively so as to perform the far field tracking. Since the system of the DPP is already known, a detailed explanation is omitted here.

When applying voltage to the variable diffraction element, three light beams are generated, realizing the DPP system tracking. Reflected light beams focused by the light beam convergence member 1305 are detected by the photo detectors 1406, 1407 and 1408. The zeroth-order light beam is detected by the photo detector 1406, the + first order diffracted light is detected by the photo detector 1407, and the − first order diffracted light is detected by the photo detector 1408.

When applying no voltage to the variable diffraction element, the light beam is transmitted directly and only the light spot 1302 is formed on the disk. The reflected light beam focused by the light beam convergence member 1305 is detected by the photo detector 1406 that is divided into two parts so as to perform the far field tracking. Applying no voltage to the variable diffraction element can increase the light beam intensity, realizing an information recording.

On the other hand, when reproducing with multi-beams, the intensity of each light beam needs to be substantially even.

In this case, the diffraction grating does not have a rectangular geometry, but has a so-called Dammann grating. The phase difference thereof is approximately π/3. The Dammann grating is explained in detail in "Dammann gratings for laser beam shaping" (J. Jahns et al., Appl. opt., Vol. 23, No. 12, pp. 1267–1275 (1989)), so an explanation here is omitted.

Figure 12:
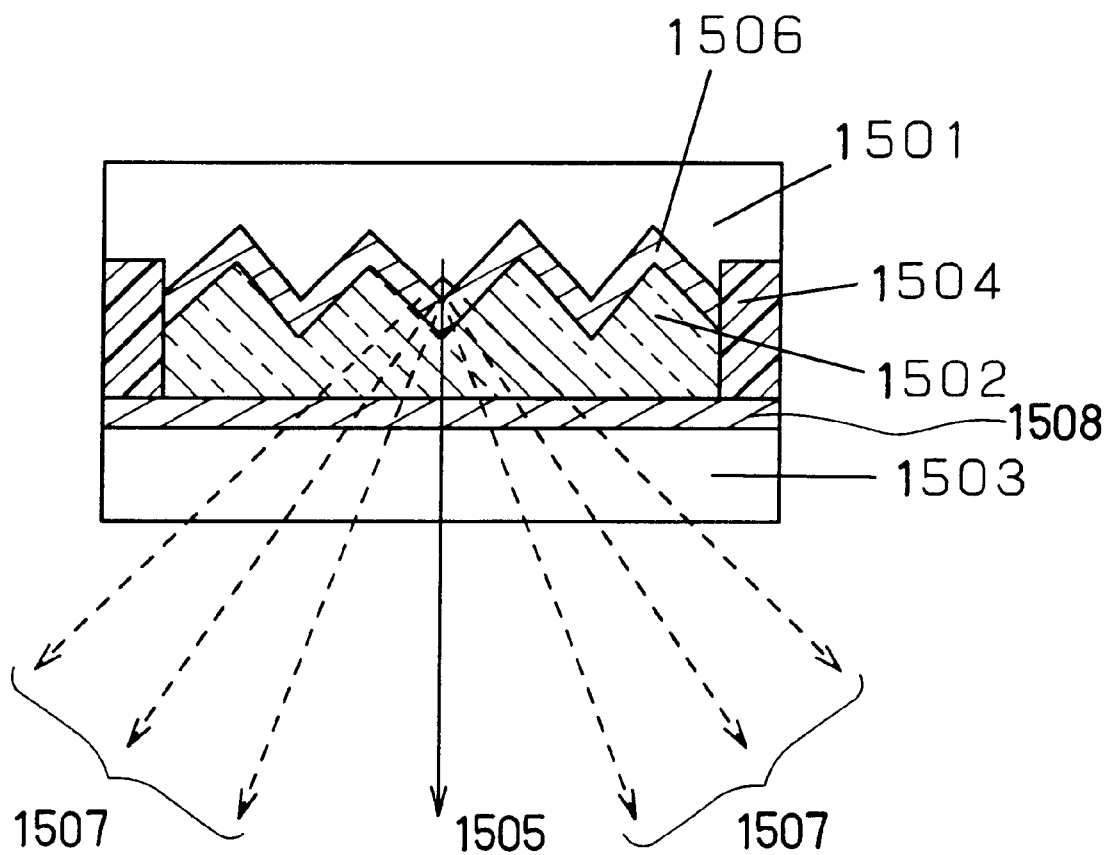
FIG. 12 is a cross-sectional view illustrating another embodiment of the light beam branching member of the present invention II.

FIG. 12 shows an embodiment having a geometry of the Dammann grating. This is an embodiment of a variable diffraction element on which triangular diffraction gratings with a depth generating multi-beams are formed. A refractive index variable member 1502 is filled between a glass substrate 1501 with one surface on which the diffraction gratings are formed and a glass substrate 1503 whose both surfaces are substantially parallel, so as to fill the diffraction grating portion. A liquid crystal was used as an example of the refractive index variable member. Solid crystals other than the liquid crystal may be used as well. Transparent electrodes 1506 and 1508 are disposed on the surface that the liquid crystal 1502 is in contact with the glass. The liquid crystal 1502 is sealed with a seal member 1504 so as to avoid leakage. When applying voltage to the variable diffraction element, a plurality of diffracted light beams 1507 that have substantially the same intensity as a zeroth-order light beam 1505 are generated. These light beams are irradiated on signal pits on different information tracks on the optical disk.

Figure 13:
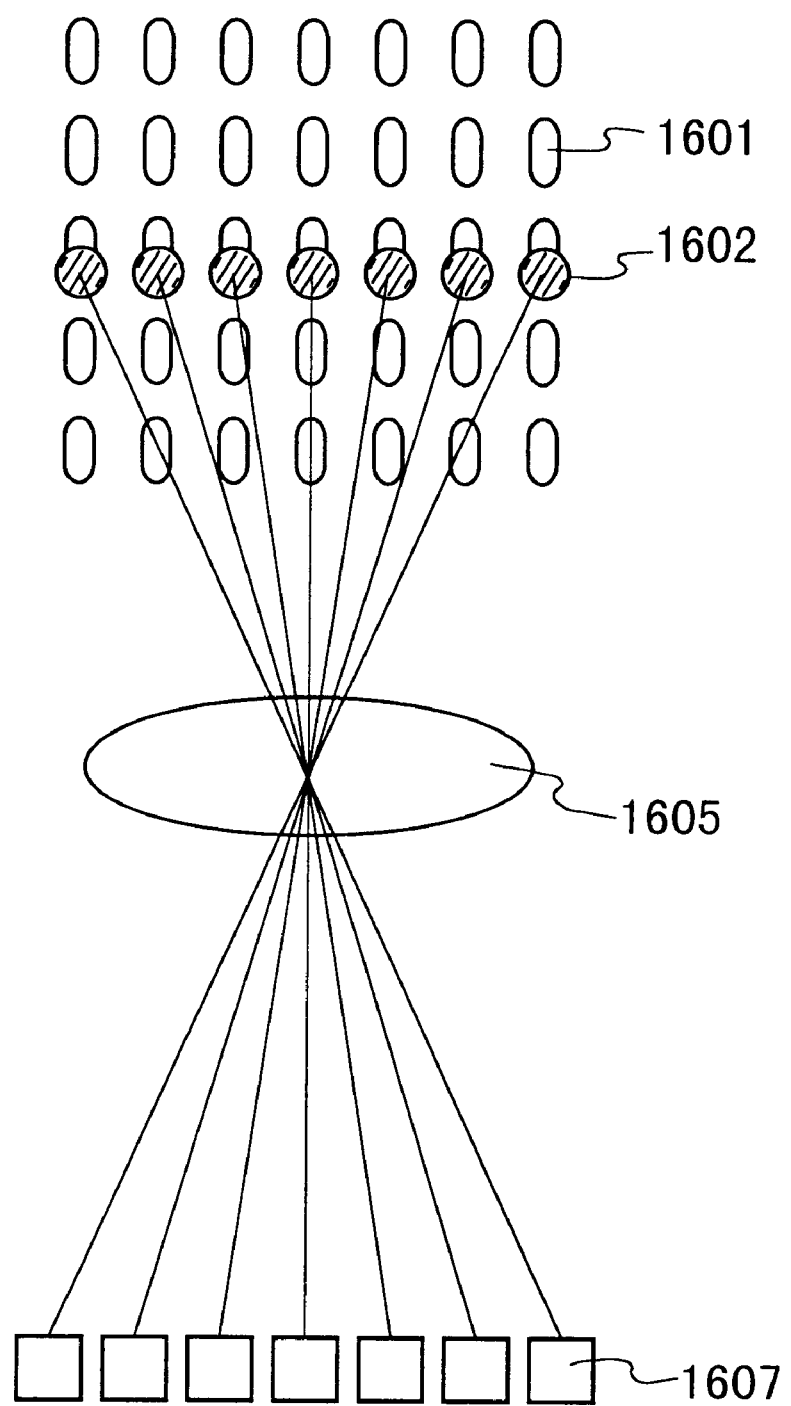
FIG. 13 shows the position of light spots on a disk when a multi-beam reproducing is performed in an information recording and reproducing apparatus of the present invention II.
Figure 14:
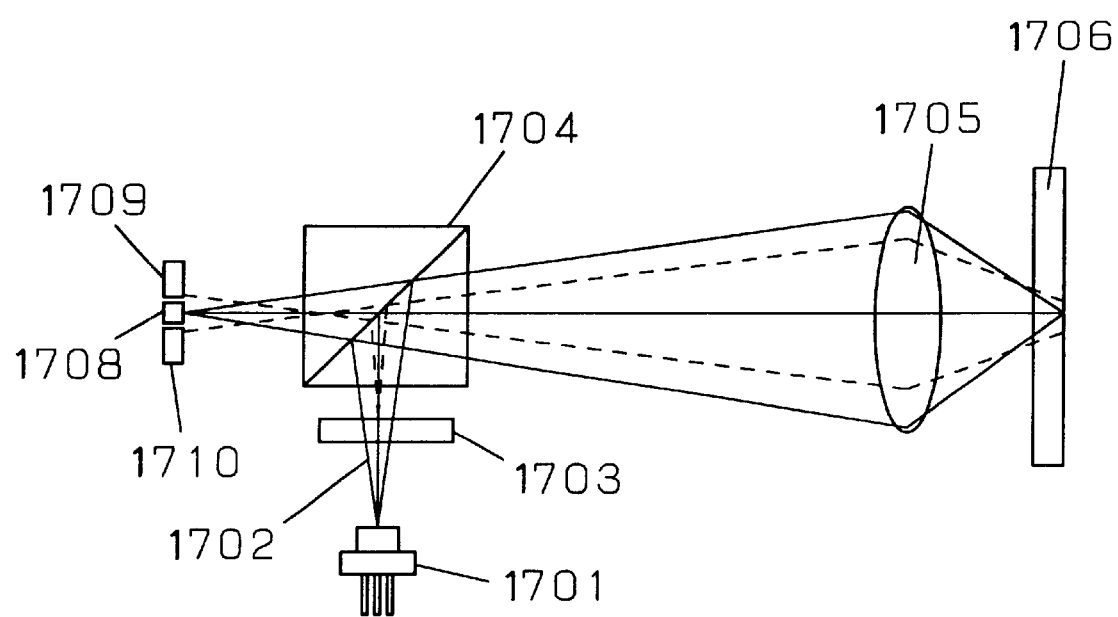
FIG. 14 shows an optical structure of a conventional information recording and reproducing apparatus.
Figure 15:
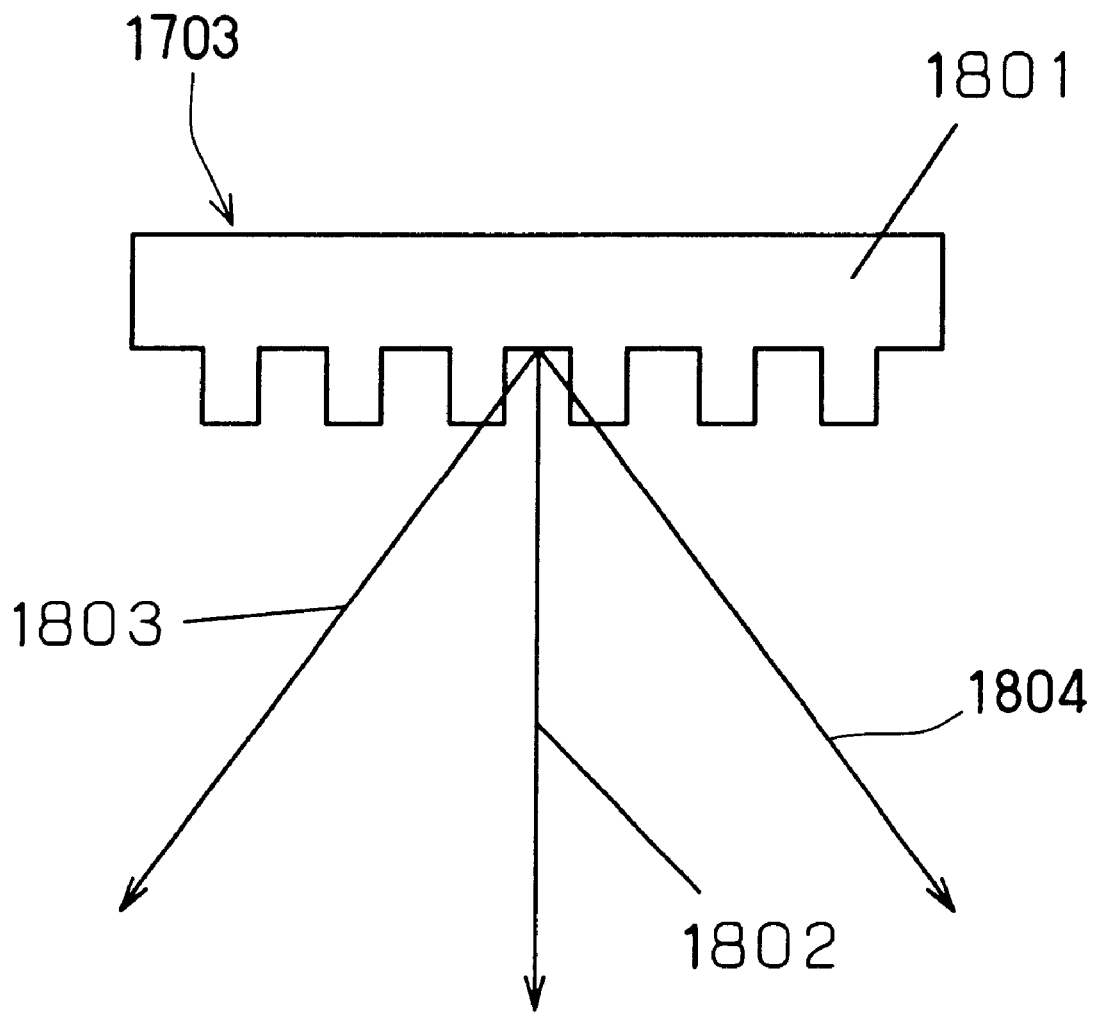
FIG. 15 is a cross-sectional view illustrating a conventional diffraction element.

FIG. 13 shows a schematic view of light spots 1602 and signal pits 1601 when irradiating the above-mentioned multi-beams. In the present embodiment, light spots 1602 due to substantially even seven light beams are formed on seven respective information tracks on the disk. The number of these light beams may be optionally selected according to the design of the diffraction gratings, but it cannot be very large in practice because an excessive number causes the angle of view of the light beams to exceed a limitation in aberration. The reflected light beams focused by a light beam convergence member 1605 are detected by a photo detecting array 1607. In this case, these seven beams are detected by at least seven photo detectors. In actual reproducing, one of the light beams is used for a servo.

When applying no voltage to the variable diffraction element, the light beam is transmitted directly and only one light spot is formed on the disk. The reflected light beam focused by the light beam convergence member 1605 is detected by the photo detector (not shown) that is divided into two parts so as to perform the far field tracking. In this case, the light beam intensity is not lowered, realizing an information recording.

As is described above, when applying voltage to the variable diffraction element, a plurality of light beams are formed to irradiate a plurality of corresponding tracks and reflected lights modulated by a signal are detected by corresponding photo detectors. When applying no voltage to the variable diffraction element, one light beam is formed and the light beam intensity increases. This system provides recording and reproducing information on optical disks. Although conventional simple configuration with multi-beams had difficulty in compatibility of recording and reproducing operations, the present invention provides the smooth compatibility of information recording and multi light beam reproducing.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An information recording and reproducing apparatus comprising:

a radiation light source;

a light beam convergence member receiving a light beam emitted from said radiation light source and focusing the light beam on an information carrier;

a light beam branching member that is located between said radiation light source and said light beam convergence member, branching the light beam;

a photo detector receiving the light beam branched by said light beam branching member; and a variable wave plate located between said light beam branching member and said light beam convergence member;

wherein the phase difference of said variable wave plate is switched between substantially (n) times a used wavelength and substantially (n±¼ wavelength) times the used wavelength, wherein n is an integer, and a light quantity received by said photo detector with respect to the information carrier without any birefringence is stored in advance, and then the phase difference of said variable wave plate is set at substantially (n) times a used wavelength when a light quantity received by said photo detector at the time of recording and reproducing is less than 50% of the light quantity that has been stored, and the phase difference of said variable wave plate is set at substantially (n±¼ wavelength) times the used wavelength when the light quantity received by said photo detector is more than 50% of the light quantity that has been stored, wherein n is an integer.

2. An information recording and reproducing apparatus comprising:

a radiation light source;

a collimator receiving a light beam emitted from said radiation light source and turning the light beam into substantially parallel light;

a light beam convergence member receiving the substantially parallel light and focusing the substantially parallel light on an information carrier;

a light beam branching member that is located between said radiation light source and said collimator, branching the light beam;

a photo detector receiving the light beam branched by said light beam branching member; and a variable wave plate located between said collimator and said light beam convergence member;

wherein the phase difference of said variable wave plate is switched between substantially (n) times a used wavelength and substantially (n±¼ wavelength) times the used wavelength, wherein n is an integer, and a light quantity received by said photo detector with respect to the information carrier without any birefringence is stored in advance, and then the phase difference of said variable wave plate is set at substantially (n) times a used wavelength when a light quantity received by said photo detector at the time of recording and reproducing is less than 50% of the light quantity that has been stored, and the phase difference of said variable wave plate is set at substantially (n±¼ wavelength) times the used wavelength when the light quantity received by said photo detector is more than 50% of the light quantity that has been stored, wherein n is an integer.

3. An information recording and reproducing apparatus comprising:

a radiation light source;

a light beam convergence member receiving a light beam emitted from said radiation light source and focusing the light beam on an information carrier;

a light beam polarization-branching member that is located between said radiation light source and said light beam convergence member, branching the light beam by polarization;

a variable wave plate located between said light beam polarization-branching member and said light beam convergence member;

a photo detector receiving the light beam branched by said light beam polarization-branching member and outputting a current according to an incident light quantity; and an output level judging member judging whether an output of said photo detector is larger or smaller than a predetermined value;

wherein a phase difference of said variable wave plate is switched according to a judgement of said output level judging member, the phase difference of said variable wave plate is switched between substantially (n) times a used wavelength and substantially (n±¼ wavelength) times the used wavelength, wherein n is an integer, and a light quantity received by said photo detector with respect to the information carrier without any birefringence is stored in advance, and then the phase difference of said variable wave plate is set at substantially (n) times a used wavelength when a light quantity received by said photo detector at the time of recording and reproducing is less than 50% of the light quantity that has been stored, and the phase difference of said variable wave plate is set at substantially (n±¼ wavelength) times the used wavelength when the light quantity received by said photo detector is more than 50% of the light quantity that has been stored, wherein n is an integer.

4. An information recording and reproducing apparatus comprising:

a radiation light source;

a collimator receiving a light beam emitted from said radiation light source and turning the light beam into substantially parallel light;

a light beam convergence member receiving the substantially parallel light and focusing the substantially parallel light on an information carrier;

a light beam polarization-branching member that is located between said radiation light source and said collimator, branching the light beam by polarization;

a variable wave plate located between said collimator and said light beam convergence member;

a photo detector receiving the light beam branched by said light beam polarization-branching member and outputting a current according to an incident light quantity; and an output level judging member judging whether an output of said photo detector is larger or smaller than a predetermined value;

wherein a phase difference of said variable wave plate is switched according to a judgement of said output level judging member, the phase difference of said variable wave plate is switched between substantially (n) times a used wavelength and substantially (n±¼ wavelength) times the used wavelength, wherein n is an integer, and a light quantity received by said photo detector with respect to the information carrier without any birefringence is stored in advance, and then the phase difference of said variable wave plate is set at substantially (n) times a used wavelength when a light quantity received by said photo detector at the time of recording and reproducing is less than 50% of the light quantity that has been stored, and the phase difference of said variable wave plate is set at substantially (n±¼ wavelength) times the used wavelength when the light quantity received by said photo detector is more than 50% of the light quantity that has been stored, wherein n is an integer.

5. The information recording and reproducing apparatus according to claim 3, wherein said light beam convergence member, said light beam polarization-branching member and said variable wave plate are integrated into a coupling member.

6. An information recording and reproducing apparatus comprising:

a first radiation light source;

a second radiation light source;

a dual wavelength branching member receiving a first light beam and a second light beam emitted from said first radiation light source and said second radiation light source and directing the first and second light beams in a predetermined direction;

a light beam convergence member receiving the first and second light beams emitted from said dual wavelength branching member and focusing the first and second light beams on an information carrier;

a variable wave plate located between said dual wavelength branching member and said light beam convergence member;

a first photo detector and a second photo detector receiving the light beam branched by said dual wavelength branching member and outputting a current according to an incident light quantity; and an output level judging member judging whether an output of said first and second photo detectors is larger or smaller than a predetermined value;

wherein a phase difference of said variable wave plate is switched according to a judgement of said output level judging member, the phase difference of said variable wave plate is switched between substantially (n) times a used wavelength and substantially (n±¼ wavelength) times the used wavelength, wherein n is an integer, and a light quality received by each of said first photo detector and said second photo detector with respect to the information carrier without any birefringence is stored in advance, and then the phase difference of said variable wave plate is set at substantially (n) times a used wavelength when a light quantity received by one or both of said first photo detector and said second photo detector at the time of recording and reproducing is less than 50% of the light quantity that has been stored, and the phase difference of said variable wave plate is set at substantially (n±¼ wavelength) times the used wavelength when the light quantity received by one or both of said first photo detector and said second photo detector is more than 50% of the light quantity that has been stored, wherein n is an integer.

* * * * *

UNITED STATES PATENT AND TRADEMARK OFFICE
CERTIFICATE OF CORRECTION

PATENT NO. : 6,584,059 B1
DATED : June 24, 2003
INVENTOR(S) : Saimi et al.

It is certified that error appears in the above-identified patent and that said Letters Patent is hereby corrected as shown below:

Column 19,
Line 3, "a light quality" should be -- a light quantity --

Signed and Sealed this

Thirtieth Day of March, 2004

JON W. DUDAS
*Acting Director of the United States Patent and Trademark Office*